United States Patent
Zhu et al.

(10) Patent No.: US 12,322,010 B2
(45) Date of Patent: Jun. 3, 2025

(54) LOGO LABELING METHOD AND DEVICE, UPDATE METHOD AND SYSTEM OF LOGO DETECTION MODEL, AND STORAGE MEDIUM

(71) Applicant: BOE Technology Group Co., Ltd., Beijing (CN)

(72) Inventors: Dan Zhu, Beijing (CN); Wenhao Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/789,670

(22) PCT Filed: Jun. 29, 2021

(86) PCT No.: PCT/CN2021/103173
§ 371 (c)(1),
(2) Date: Jun. 28, 2022

(87) PCT Pub. No.: WO2023/272495
PCT Pub. Date: Jan. 5, 2023

(65) Prior Publication Data
US 2024/0212239 A1 Jun. 27, 2024

(51) Int. Cl.
*G06T 11/60* (2006.01)
*G06T 7/73* (2017.01)
(Continued)

(52) U.S. Cl.
CPC .............. *G06T 11/60* (2013.01); *G06T 7/73* (2017.01); *G06V 10/225* (2022.01); *G06V 10/26* (2022.01);
(Continued)

(58) Field of Classification Search
CPC . G06T 11/60; G06T 7/73; G06T 2207/10024; G06T 2207/20081;
(Continued)

(56) References Cited

U.S. PATENT DOCUMENTS 10,489,683 B1  11/2019  Koh et al.
2010/0011297 A1  1/2010  Tsai et al.
(Continued)

FOREIGN PATENT DOCUMENTS

CN  109359207 A  2/2019
CN  109800698 A  5/2019
(Continued)

OTHER PUBLICATIONS

English Translation—Extracting the foreground from the original image and the corresponding alpha image and composing the new image (based on python+opencv) <https://blog.csdn.net/qianbin3200896/article/details/87934119>.
(Continued)

*Primary Examiner* — Said Broome
*Assistant Examiner* — Andrew Shin
(74) *Attorney, Agent, or Firm* — Banner & Witcoff, Ltd.

(57) ABSTRACT

A logo labeling method and device, an update method and system, and a storage medium are provided. The logo labeling method includes: acquiring a standard logo picture including a logo; based on the standard logo picture, determining transparency channel information to obtain a first logo picture; determining a circumscribed rectangle frame of the logo in the first logo picture based on the transparency channel information, and performing cutting processing on the first logo picture according to the circumscribed rectangle frame to obtain a second logo picture; performing data augmentation processing based on the second logo picture to obtain at least one third logo picture; and acquiring a
(Continued)

background picture, determining pasting position information of the third logo picture in the background picture, and pasting the third logo picture on the background picture according to the pasting position information to obtain at least one logo labeling picture.

20 Claims, 5 Drawing Sheets

(51) Int. Cl.
  *G06V 10/22* (2022.01)
  *G06V 10/26* (2022.01)
  *G06V 10/774* (2022.01)
  *G06V 10/776* (2022.01)
  *G06V 10/82* (2022.01)
  *G06V 20/60* (2022.01)
  *G06V 20/70* (2022.01)
(52) U.S. Cl.
  CPC .......... *G06V 10/774* (2022.01); *G06V 10/776* (2022.01); *G06V 10/82* (2022.01); *G06V 20/60* (2022.01); *G06V 20/70* (2022.01); *G06T 2207/10024* (2013.01); *G06T 2207/20081* (2013.01); *G06T 2207/20084* (2013.01); *G06T 2210/12* (2013.01); *G06T 2210/62* (2013.01); *G06V 2201/09* (2022.01)
(58) Field of Classification Search
  CPC ....... G06T 2207/20084; G06T 2210/12; G06T 2210/62; G06V 10/225; G06V 10/26; G06V 10/774; G06V 10/776; G06V 10/82; G06V 20/60; G06V 20/70; G06V 2201/09; G06N 3/08
  See application file for complete search history.

(56) References Cited

U.S. PATENT DOCUMENTS

| | | | | |
|---|---|---|---|---|
| 2018/0285696 | A1* | 10/2018 | Eigen | ........................ G06T 5/00 |
| 2021/0034878 | A1* | 2/2021 | Deng | .................... G06F 18/254 |

FOREIGN PATENT DOCUMENTS

| | | | |
|---|---|---|---|
| CN | 110246567 | A | 9/2019 |
| CN | 110660115 | A | 1/2020 |
| CN | 111476284 | A | 7/2020 |
| CN | 111932673 | A | 11/2020 |
| CN | 112070137 | A | 12/2020 |

OTHER PUBLICATIONS

You Mingyu, et al., "Small-Sample License Plate Recognition Based on Sample Expansion," College of Electronics and Information Engineering, Tongji University, Shanghai 201804, China, Sep. 2019.

* cited by examiner

LOGO LABELING METHOD AND DEVICE, UPDATE METHOD AND SYSTEM OF LOGO DETECTION MODEL, AND STORAGE MEDIUM

The application is a U.S. National Phase Entry of International Application No. PCT/CN2021/103173 filed on Jun. 29, 2021, designating the United States of America. The present application claims priority to and the benefit of the above-identified application and the above-identified application is incorporated by reference herein in its entirety.

TECHNICAL FIELD

The embodiments of the present disclosure relate to a logo labeling method and device, an update method and system of a logo detection model, and a non-transitory storage medium.

BACKGROUND

The purpose of computer vision research is to use computers to realize the functions of human perception, recognition, and understanding of the objective world. Object detection (also known as "target detection"), as one of core research topics in a field of computer vision, has been widely concerned in a theoretical research field of computer vision, and has a broad application prospect. A target detection technology integrates cutting-edge technologies in many fields, such as image processing, pattern recognition, artificial intelligence, computer vision, etc., and has been widely applied in many fields, such as an intelligent transportation system, an intelligent monitoring system, a human-computer interaction, an automatic driving, an image retrieval, an intelligent robot, etc.

SUMMARY

At least some embodiments of the present disclosure provide a logo labeling method, comprising: acquiring a standard logo picture, where the standard logo picture comprises a logo; based on the standard logo picture, determining transparency channel information corresponding to the standard logo picture to obtain a first logo picture, where the first logo picture comprises the transparency channel information; determining a circumscribed rectangle frame of the logo in the first logo picture based on the transparency channel information, and performing cutting processing on the first logo picture according to the circumscribed rectangle frame to obtain a second logo picture, where the second logo picture comprises the logo; performing data augmentation processing based on the second logo picture to obtain at least one third logo picture; and acquiring a background picture, determining pasting position information of the at least one third logo picture in the background picture, and pasting the at least one third logo picture on the background picture according to the pasting position information to obtain at least one logo labeling picture.

For example, in the logo labeling method provided by some embodiments of the present disclosure, based on the standard logo picture, determining the transparency channel information corresponding to the standard logo picture to obtain the first logo picture, comprises: obtaining a standard logo gray-scale picture according to the standard logo picture; judging a size relationship between a gray-scale value of each pixel in the standard logo gray-scale picture and a first threshold to determine transparency channel data corresponding to each pixel in the standard logo gray-scale picture, and further to obtain the transparency channel information corresponding to the standard logo picture; and combining data information of the standard logo picture with the transparency channel information to obtain the first logo picture.

For example, in the logo labeling method provided by some embodiments of the present disclosure, in the first logo picture, transparency channel data corresponding to the logo is not zero, and all other transparency channel data except the transparency channel data corresponding to the logo is zero.

For example, in the logo labeling method provided by some embodiments of the present disclosure, determining the circumscribed rectangle frame of the logo in the first logo picture based on the transparency channel information, comprises: in the transparency channel information, searching and determining an abscissa w1 of a pixel, which is a first one pixel whose value is not zero, in a row direction, an abscissa w2 of a pixel, which is a last one pixel whose value is not zero, in the row direction, an ordinate h1 of a pixel, which is a first one pixel whose value is not zero, in a column direction, and an ordinate h2 of a pixel, which is a last one pixel whose value is not zero, in the column direction to determine the circumscribed rectangle frame, where coordinates of four vertices of the circumscribed rectangle frame are (w1, h1), (w1, h2), (w2, h1), and (w2, h2), respectively.

For example, in the logo labeling method provided by some embodiments of the present disclosure, the data augmentation processing comprises at least one selected from a group consisting of scaling processing, color transformation processing, and rotation processing.

For example, in the logo labeling method provided by some embodiments of the present disclosure, determining the pasting position information of the at least one third logo picture in the background picture, and pasting the at least one third logo picture on the background picture according to the pasting position information to obtain the at least one logo labeling picture, comprises: determining a starting coordinate point (ws, hs) for pasting in the background picture, where a value range of ws and a value range of hs satisfy: $0 \le ws \le (Wb-Ws)$, $0 \le hs \le (Hb-Hs)$, Wb and Hb respectively represent a width and a height of the background picture, and Ws and Hs respectively represent a width and a height of the at least one third logo picture; and overlapping a first vertex of the at least one third logo picture with the starting coordinate point, and simultaneously enabling a width direction and a height direction of the at least one third logo picture to be parallel to a width direction and a height direction of the background picture, respectively, so as to paste the at least one third logo picture on the background picture, thereby obtaining the at least one logo labeling picture.

For example, in the logo labeling method provided by some embodiments of the present disclosure, labeling information of the at least one logo labeling picture can be expressed as [id, (ws+Ws/2)/Wb, (hs+Hs/2)/Hb, Ws/Wb, Hs/Hb], where id is a label of the logo, (ws+Ws/2)/Wb is an abscissa of a normalized center position of a real bounding box of the logo, (hs+Hs/2)/Hb is an ordinate of the normalized center position of the real bounding box of the logo, Ws/Wb is a width of the real bounding box of the logo, and Hs/Hb is a height of the real bounding box of the logo.

For example, in the logo labeling method provided by some embodiments of the present disclosure, determining the pasting position information of the at least one third logo picture in the background picture, and pasting the at least one third logo picture on the background picture according to the pasting position information to obtain the at least one logo labeling picture, comprises: determining a central coordinate point (ws0, hs0) for pasting in the background picture, where a value range of ws0 and a value range of hs0 satisfy: Ws/2≤ws0≤(Wb−Ws/2), Hs/2≤hs0≤(Hb−Hs/2), Wb and Hb respectively represent a width and a height of the background picture, and Ws and Hs respectively represent a width and a height of the at least one third logo picture; and overlapping a central point of the at least one third logo picture with the central coordinate point, and simultaneously enabling a width direction and a height direction of the at least one third logo picture to be parallel to a width direction and a height direction of the background picture, respectively, so as to paste the at least one third logo picture on the background picture, thereby obtaining the at least one logo labeling picture.

For example, in the logo labeling method provided by some embodiments of the present disclosure, labeling information of the at least one logo labeling picture can be expressed as [id, ws0/Wb, hs0/Hb, Ws/Wb, Hs/Hb], where id is a label of the logo, ws0/Wb is an abscissa of a normalized center position of a real bounding box of the logo, hs0/Hb is an ordinate of the normalized center position of the real bounding box of the logo, Ws/Wb is a width of the real bounding box of the logo, and Hs/Hb is a height of the real bounding box of the logo.

For example, in the logo labeling method provided by some embodiments of the present disclosure, a foreground of the standard logo picture is the logo, a background of the standard logo picture is a solid color background, and a color of the logo does not comprise a color of the solid color background.

For example, the logo labeling method provided by some embodiments of the present disclosure further comprises: adding the at least one logo labeling picture into a first training data set to obtain a second training data set.

At least some embodiments of the present disclosure also provide an update method of a logo detection model, comprising: acquiring an input picture; detecting the input picture through the logo detection model to obtain a detection result, where the detection result comprises a confidence level; and judging whether the confidence level is greater than a second threshold, in a case where the confidence level is greater than the second threshold, outputting the detection result through the logo detection model, in a case where the confidence level is not greater than the second threshold, outputting a detection failure prompt through the logo detection model; in a case where the logo detection model outputs the detection failure prompt, judging whether the input picture comprises a logo or not, if the input picture comprises the logo, determining a standard logo picture according to the input picture, if the input picture does not comprise the logo, storing the input picture; in a case where the input picture comprises the logo, processing the standard logo picture by adopting the logo labeling method according to any embodiment of the present disclosure to obtain at least one logo labeling picture; adding the at least one logo labeling picture into a first training data set to obtain a second training data set; and updating the logo detection model based on the second training data set to obtain an updated logo detection model.

For example, in the update method provided by some embodiments of the present disclosure, the logo detection model is a YOLO-v5 model trained based on the first training data set.

For example, in the update method provided by some embodiments of the present disclosure, a value range of the confidence level is [0, 1], and a value range of the second threshold is [0.25, 0.35].

For example, in the update method provided by some embodiments of the present disclosure, outputting the detection result through the logo detection model, comprises: outputting the detection result to a user terminal through the logo detection model; outputting the detection failure prompt through the logo detection model, comprises: outputting a first detection failure prompt to the user terminal through the logo detection model; and outputting a second detection failure prompt to an operation and maintenance terminal through the logo detection model.

For example, the update method provided by some embodiments of the present disclosure further comprises: adding the logo corresponding to the at least one logo labeling picture into a logo library corresponding to the first training data set to obtain a logo library corresponding to the second training data set.

At least some embodiments of the present disclosure also provide a logo labeling device, comprising: a memory, used for non-temporarily storing computer-readable instructions; and a processor, used for running the computer-readable instructions. In a case where the computer-readable instructions are run by the processor, the logo labeling method according to any embodiment of the present disclosure is executed.

At least some embodiments of the present disclosure also provide an update system of a logo detection model, comprising: a logo detection module and a logo labeling module, the logo detection module is configured to: acquire an input picture; detect the input picture through the logo detection model to obtain a detection result, where the detection result comprises a confidence level; and judge whether the confidence level is greater than a second threshold, in a case where the confidence level is greater than the second threshold, output the detection result through the logo detection model, and in a case where the confidence level is not greater than the second threshold, output a detection failure prompt through the logo detection model; and the logo labeling module is configured to: process a standard logo picture, which is obtained based on the input picture, by adopting the logo labeling method according to any embodiment of the present disclosure to obtain at least one logo labeling picture; add the at least one logo labeling picture into a first training data set to obtain a second training data set; and trigger an operation of updating the logo detection model based on the second training data set.

For example, the update system provided by some embodiments of the present disclosure further comprises an update module, and the update module is configured to update the logo detection model based on the second training data set to obtain an updated logo detection model.

At least some embodiments of the present disclosure also provide a non-transitory storage medium, storing computer-readable instructions non-transiently, and in a case where the computer-readable instructions are executed by a computer, the logo labeling method according to any embodiment of the present disclosure can be executed.

BRIEF DESCRIPTION OF THE DRAWINGS

In order to more clearly illustrate the technical solutions of the embodiments of the present disclosure, the drawings of the embodiments will be briefly described in the following; it is obvious that the described drawings are only related to some embodiments of the present disclosure and thus are not limitative to the present disclosure.

DETAILED DESCRIPTION

Figure 1:
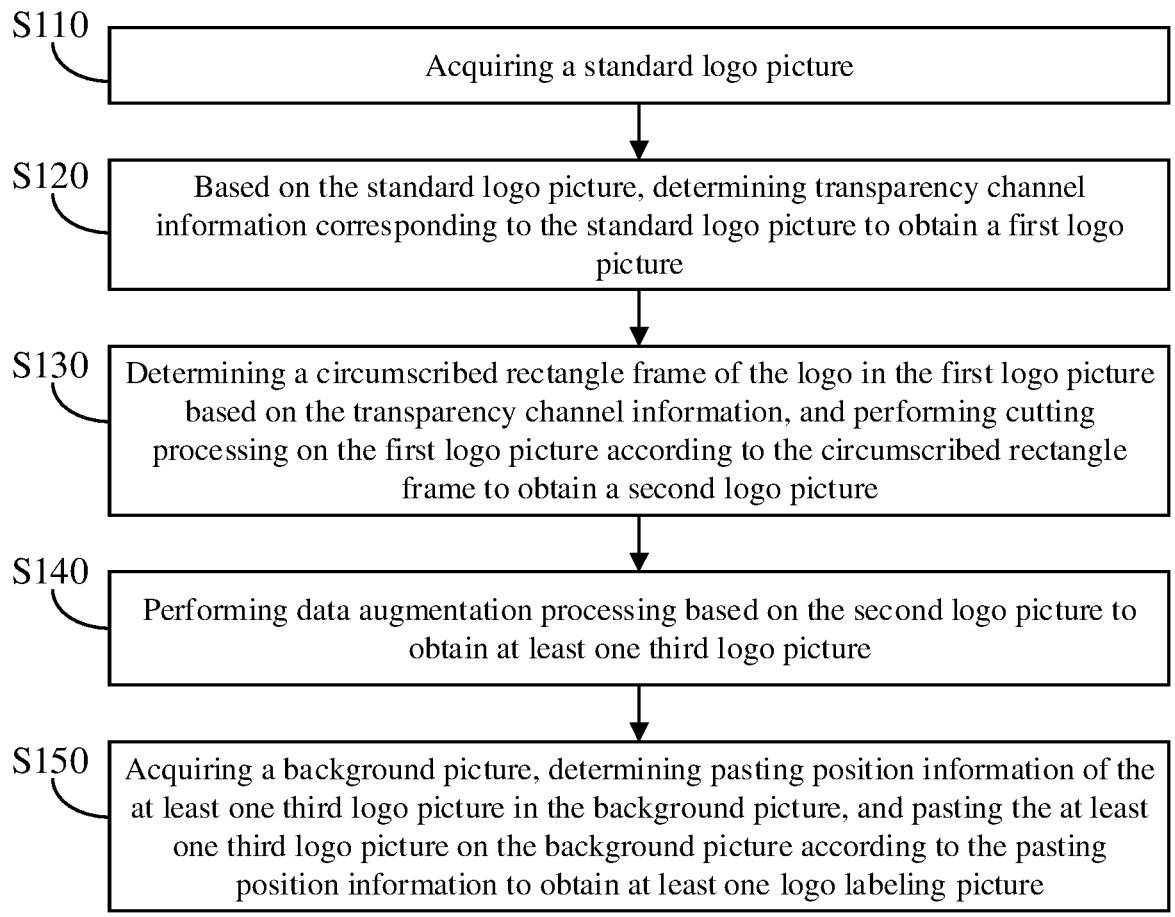
FIG. 1 is a flowchart of a logo labeling method provided by some embodiments of the present disclosure.

In order to make objects, technical solutions, and advantages of the embodiments of the present disclosure more apparent, the technical solutions of the embodiments of the present disclosure will be described below in a clearly and fully understandable way in connection with the drawings related to the embodiments of the present disclosure. Apparently, the described embodiments are just a part but not all of the embodiments of the present disclosure. Based on the described embodiments of the present disclosure, those skilled in the art can obtain other embodiment(s), without any inventive work, which should be within the protection scope of the present disclosure.

Unless otherwise defined, all the technical and scientific terms used in the present disclosure have the same meanings as commonly understood by one of ordinary skill in the art to which the present disclosure belongs. The terms "first," "second," etc., which are used in the present disclosure, are not intended to indicate any sequence, amount, or importance, but distinguish various components. Also, the terms such as "a," "an," etc., are not intended to limit the amount, but indicate the existence of at least one. The terms "comprise," "comprising." "include." "including." etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the absolute position of the object which is described changes, the relative position relationship may also change accordingly.

Before an object detection model based on deep learning is applied in practice, it usually needs a large number of related data (for example, pictures) that has been labeled and processed to support an algorithm training. Data labeling is a kind of behavior in which a data processing personnel processes data for deep learning with the help of labeling tools (such as BasicFinder, etc.). Generally, the types of the data labeling include: picture labeling, voice labeling, text labeling, video labeling, and so on. The basic forms of the labeling include a labeling frame, a 3D frame, a text transcription, image dotting, a target object contour outline, etc.

By taking a logo detection as an example, a common target detection algorithm/model can be used to detect a logo in an input picture. For example, the common target detection algorithm/model includes, but is not limited to, R-CNN (Region-based Convolutional Neural Networks), SPP-net (Spatial Pyramid Pooling-net), Fast R-CNN, Fast R-CNN, R-FCN (Region-Based Fully Convective Networks), YOLO (You Only Look Once), SSD (Single Shot MultiBox Detector), etc. For example, a detection result of the above target detection algorithm/model may include a probability and a position of the logo contained in the input picture. For example, the target detection algorithm can determine the position of an object by returning a predicted bounding box (bbox) of the object. For example, the detection result of the target detection algorithm/model can be expressed as [L0, X0, Y0, W0, H0], where L0 is a confidence level, which is a value in a range of [0,1], the confidence level can represent a probability that the predicted bounding box has an object (such as a logo), and can also represent an intersection over union (IOU) between the predicted bounding box and a real bounding box; (X0, Y0) represent coordinates of a normalized center position of the predicted bounding box, and W0 and H0 represent a normalized width and a normalized height of the predicted bounding box, respectively; for example, the detection result of the target detection algorithm/model can also be expressed as [L0, X1, Y1, X2, Y2], where L0 is the confidence level, and (X1, Y1) and (X2, Y2) respectively represent normalized position coordinates of two vertices, located at two ends of a certain diagonal line, of the predicted bounding box. For example, if (X1, Y1) and (X2, Y2) respectively represent the coordinates of a top-left corner vertex and a lower right corner vertex of the predicted bounding box, then X0=(X1+X2)/2, Y0=(Y1+Y2)/2, W0=X2−X1, and H0=Y2−Y1.

In order to enable the common target detection model to detect and identify a logo, a large number of labeled logo pictures can be used to train the target detection model from scratch, so as to obtain a trained target detection model (i.e., a logo detection model that can be used to identify and detect the logos can be obtained). For example, the training process can refer to common training methods, which are not repeated herein again. Of course, the pre-trained target detection model can also be selected. However, the pre-trained target detection model tends to only be able to detect and identify the logo included in the training data set. Therefore, it is necessary to continuously train and update the target detection model with new labeled logo pictures (including new logos that do not exist in the original training data set) to enable the detection performance of the target detection model to be more powerful.

At least some embodiments of the present disclosure provide a logo labeling method, which includes acquiring a standard logo picture, where the standard logo picture comprises a logo; based on the standard logo picture, determining transparency channel information corresponding to the standard logo picture to obtain a first logo picture, where the first logo picture comprises the transparency channel information; determining a circumscribed rectangle frame of the logo in the first logo picture based on the transparency channel information, and performing cutting processing on the first logo picture according to the circumscribed rectangle frame to obtain a second logo picture, where the second logo picture comprises the logo; performing data augmentation processing based on the second logo picture to obtain at least one third logo picture; and acquiring a background picture, determining pasting position information of the at least one third logo picture in the background picture, and pasting the at least one third logo picture on the background picture according to the pasting position information to obtain at least one logo labeling picture.

Some embodiments of the present disclosure also provide a logo labeling device corresponding to the above logo labeling method, an update method of a logo detection model, and an update system of a logo detection model.

According to the logo labeling method provided by the embodiment of the present disclosure, the logo (including transparency channel information) can be automatically extracted from the standard logo picture, then the data augmentation processing is performed on the logo, and the logo labeling picture (including labeling information) can be obtained through pasting, so as to perfect the training data set.

Several embodiments of the present disclosure will be described in detail below with reference to the accompanying drawings. It should be noted that in order to keep the description of the embodiments of the present disclosure clear and concise, the detailed descriptions of known functions and known parts (elements) can be omitted. In the case where any part (element) of the embodiment of the present disclosure appears in more than one drawing, the part (element) is represented by the same or similar reference numeral in each drawing.

FIG. 1 is a flowchart of a logo labeling method provided by some embodiments of the present disclosure. As shown in FIG. 1, the logo labeling method includes the following steps S110 to S150.

Step S110: acquiring a standard logo picture.

For example, the standard logo picture includes a logo. For example, in some embodiments, a foreground of the standard logo picture is a logo pattern, and a background of the standard logo picture is a solid color (i.e., a single color) background or a background close to a solid color. For example, in some embodiments, for the convenience of processing, the background of the standard logo picture can be set as a white background (i.e., a white background), and the embodiments of the present disclosure include but are not limited to this case.

For example, in some embodiments, a common logo picture can be obtained first, and then the image editing processing can be performed on the common logo picture to obtain the standard logo picture that meet the requirement. For example, in some examples, the common logo picture includes not only a logo pattern, but also other scenes and objects (people, animals and plants, landscapes, etc.); in this case, other scenes and objects except the logo pattern can be removed by the image editing processing, and then the logo pattern can be used as the foreground, the part other than the logo pattern can be used as the background, and then the background can be set as a white background, thereby obtaining the standard logo picture.

For example, in some implementations, the logo pattern in the standard logo picture can be a color pattern or a gray-scale pattern. That is, the standard logo picture can be a color picture on a white background or a gray-scale picture on a white background, which is not limited by the embodiments of the present disclosure. For example, the color picture includes but is not limited to a color picture with three color channels, and the like. For example, the three color channels include a first color channel, a second color channel, and a third color channel. For example, the three color channels respectively correspond to the three primary colors. For example, in some embodiments, the first color channel is a red (R) channel, the second color channel is a green (G) channel, and the third color channel is a blue (B) channel, that is, the above-mentioned color picture can be a color picture in a RGB format. It should be noted that the embodiments of the present disclosure include but are not limited to this case.

It should be noted that, in other embodiments, for the convenience of processing, the background of the standard logo picture can also be set to, for example, a black background (i.e., a black background) or the like. In this case, the standard logo picture can be a color picture on a black background or a gray-scale picture on a black background.

For example, in some embodiments, after the background in the standard logo picture is set to a solid color background (e.g., a white background or a black background, etc.), the logo pattern itself in the standard logo picture can be made not to include the background color through the image editing processing, thus facilitating the determination of the transparency channel information in the subsequent step S120. For example, in the case that the background of the standard logo picture is a white background (i.e., a white background), the logo pattern itself may not include white; for example, in the case that the background of the standard logo picture is a black background (i.e., a black background), the logo pattern itself may not include black.

It should be understood that in the standard logo picture acquired in step S110, a shape of the logo pattern is a focus of the logo labeling method provided by the embodiment of the present disclosure, and whether the color of the logo pattern is processed or not is not limited by the embodiments of the present disclosure. That is, in the embodiment of the present disclosure, for any picture including the logo pattern, a corresponding standard logo picture can be obtained by making the color of the logo pattern and the background have clearly contrast through the image editing processing while without processing the shape of the logo pattern.

Step S120: based on the standard logo picture, determining transparency channel information corresponding to the standard logo picture to obtain a first logo picture.

Figure 2:
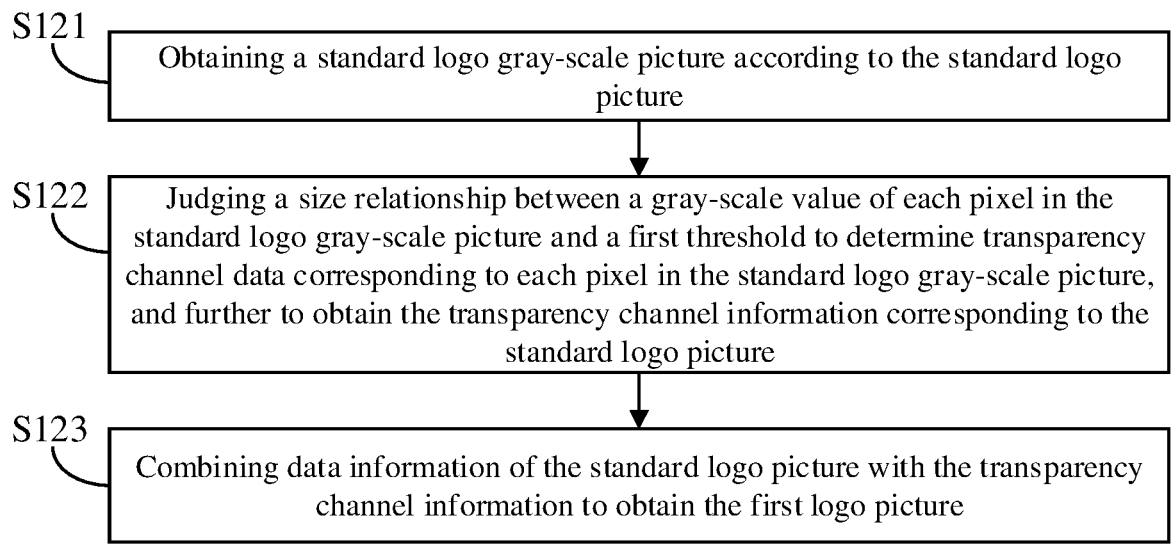
FIG. 2 is an exemplary flowchart corresponding to a step S120 as shown in FIG. 1 provided by some embodiments of the present disclosure.

For example, the first logo picture includes not only the channel information of the standard logo picture itself, but also the transparency channel information. FIG. 2 is an exemplary flowchart corresponding to step S120 as shown in FIG. 1 provided by some embodiments of the present disclosure. Hereinafter, the step S120 will be described in detail with reference to FIG. 2, by taking the case that the standard logo picture is a color picture on a white background and is in a RGB format as an example, but it should not be regarded as a limitation to the embodiments of the present disclosure.

For example, as shown in FIG. 2, based on the standard logo picture, the transparency channel information corresponding to the standard logo picture is determined to obtain the first logo picture, that is, step S120 may include the following steps S121 to S125.

Step S121: obtaining a standard logo gray-scale picture according to the standard logo picture.

For example, in some examples, in the case that the standard logo picture is a color picture on a white background and is in a RGB format, the standard logo picture can be converted into the standard logo gray-scale picture by the following formula:

$$Gray = R*0.299 + G*0.587 + B*0.114,$$

where Gray represents luminance information (i.e., data information of a luminance channel, i.e., "gray-scale information") of a gray-scale picture (e.g., the standard logo gray-scale picture), and R. G, and B respectively represent red information (i.e., data information of a red channel), green information (i.e., data information of a green channel), and blue information (i.e., data information of a blue channel) of the color picture in the RGB format.

For example, in the case where the standard logo picture itself belongs to a gray-scale picture (for example, a gray-scale picture on a white background), the standard logo picture is directly taken as the standard logo gray-scale picture.

Step S122: judging a size relationship between a gray-scale value of each pixel in the standard logo gray-scale picture and a first threshold to determine transparency channel data corresponding to each pixel in the standard logo gray-scale picture, and further to obtain the transparency channel information corresponding to the standard logo picture.

For example, in some examples, the size relationship between the gray-scale value Gray of each pixel in the standard logo gray-scale picture and the first threshold Gray0 can be judged; if Gray is greater than Gray0, the transparency channel data corresponding to the pixel is set to 0%; if Gray is less than or equal to Gray0, the transparency channel data corresponding to the pixel is set to 100%. Respective pixels in the standard logo picture are in one-to-one correspondence with respective pixels in the standard logo gray-scale picture, so the transparency channel information corresponding to the standard logo picture includes the transparency channel data corresponding to all pixels in the standard logo gray-scale picture. For example, the first threshold Gray0 can be set according to actual needs. For example, in the case that the standard logo picture is the color picture on the white background in the RGB format, by taking the case that each of R. G, and B is 8 bits digital information as an example, Gray0 can be set to, for example, 225, for example, 235, for example, 245, for example, 255, and so on.

The transparency channel is generally referred to as an ALPHA channel, the ALPHA channel is used to save an opacity parameter. If the data of the ALPHA channel of a pixel is 0%, the pixel is completely transparent (invisible when displaying); if the data of the ALPHA channel of a pixel is 100%, the pixel is completely opaque; if the data of the ALPHA channel of a pixel is between 0% and 100%, the pixel can be displayed through the background, just as displaying through a glass (translucency).

By taking the case that R. G, and B are all the digital information with 8 bits as an example, the transparency channel data can also be digital information with 8 bits. In this case, the transparency channel data being 0% corresponds to the transparency channel data being 0; the transparency channel data being 100% corresponds to the transparency channel data being 256. It should be noted that the embodiments of the present disclosure include but are not limited to this case. For example, in the embodiment of the present disclosure, because the value of the transparency channel data can be binary (i.e., the value is 0% or 100%), the transparency channel data can be saved as 1-bit digital information, where the transparency channel data being 0% corresponds to the transparency channel data being 0, and the transparency channel data being 100% corresponds to the transparency channel data being 1.

It should be understood that the purpose of step S122 is to set the transparency channel data corresponding to the logo pattern in the standard logo picture to 100% (i.e., the logo pattern is opaque), and simultaneously set the transparency channel data corresponding to the background in the standard logo picture to 0% (i.e., the background is transparent). Therefore, in the case where the background of the standard logo picture is other solid color background, the setting basis of the first threshold and the transparency channel data can be determined according to the actual needs. For example, in the case that the standard logo picture is the color picture on the black background in the RGB format, the size relationship between the gray-scale value Gray of each pixel in the standard logo gray-scale picture and the first threshold Gray0 can be judged; if Gray is less than Gray0, the transparency channel data corresponding to the pixel is set to 0%; if Gray is greater than or equal to Gray0, the transparency channel data corresponding to the pixel is set to 100%.

S123: combining data information of the standard logo picture with the transparency channel information to obtain the first logo picture.

For example, in some examples, the first logo picture is a color picture in RGBA format, where A represents the aforementioned ALPHA channel (i.e., the transparency channel). It should be noted that the embodiments of the present disclosure include but are not limited to this case. For example, in the case where the standard logo picture is a gray-scale picture including one channel (i.e., a luminance channel) and the first logo picture is a gray-scale picture including two channels (i.e., a luminance channel and a transparency channel).

For example, in some examples, the transparency channel data corresponding to the logo in the first logo picture all are not 0, and the rest transparency channel data in the first logo picture all are 0.

S130: determining a circumscribed rectangle frame of the logo in the first logo picture based on the transparency channel information, and performing cutting processing on the first logo picture according to the circumscribed rectangle frame to obtain a second logo picture.

For example, the second logo picture includes the logo. For example, specifically, the second logo picture includes a region where the circumscribed rectangle frame in the first logo picture (the circumscribed rectangle frame includes the logo pattern) is located.

Figure 3:
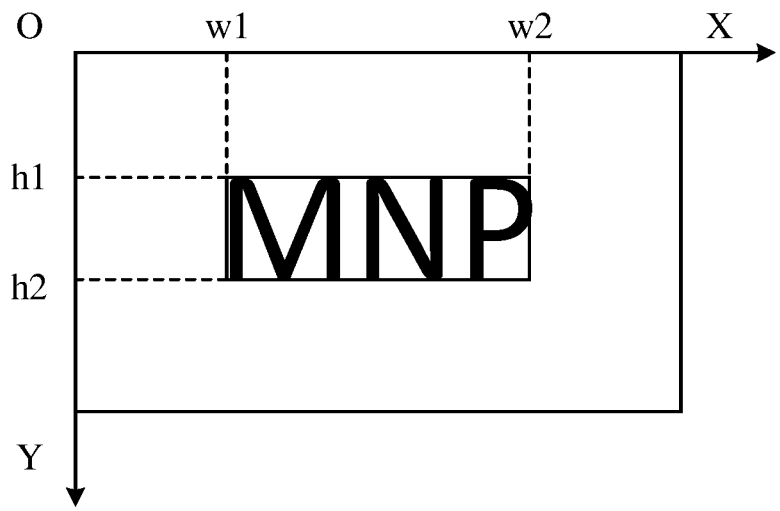
FIG. 3 is a schematic diagram of an operation of determining a circumscribed rectangle frame of a logo provided by some embodiments of the present disclosure.

FIG. 3 is a schematic diagram of an operation of determining a circumscribed rectangle frame of a logo provided by some embodiments of the present disclosure. For example, as shown in FIG. 3, the logo pattern in the second logo picture is "MNP". The transparency channel data corresponding to the logo pattern in the second logo picture are all not 0, while the transparency channel data corresponding to the background in the second logo picture are all 0. It should be understood that the transparency channel information itself can usually be regarded as a two-dimensional picture or a two-dimensional matrix.

For example, in some examples, as shown in FIG. 3, in the transparency channel information, an abscissa w1 of a pixel, which is a first one pixel whose value is not zero, in a first direction X (i.e., a width direction of the picture, i.e., a row direction of a matrix), an abscissa w2 of a pixel, which is a last one pixel whose value is not zero, in the first direction X, an ordinate h1 of a pixel, which is a first one pixel whose value is not zero, in a second direction Y (i.e., a height direction of the picture, that is, a column direction of a matrix), and an ordinate h2 of a pixel, which is a last one pixel whose value is not zero, in the second direction Y can be searched and determined, so that the circumscribed rectangle frame of the logo pattern can be determined, and coordinates of four vertices of the circumscribed rectangle frame are (w1, h1), (w1, h2), (w2, h1), and (w2, h2) respectively. For example, the first direction X and the second direction Y are perpendicular to each other. For example, w1, w2, h1, and h2 are all positive integers, and the circumscribed rectangle frame includes (w2−w1+1)*(h2−h1+1) pixels.

It should be noted that, in the embodiment of the present disclosure, for the circumscribed rectangle frame of the logo, one set of opposite sides is parallel to the first direction X (i.e., parallel to the width direction of the second logo picture), and the other set of opposite sides is parallel to the second direction Y (i.e., parallel to the height direction of the second logo picture). It should be understood that the circumscribed rectangle frame of the logo usually includes part of background information (the transparency channel data corresponding to the background information are all 0) in addition to the logo pattern, and the embodiment of the present disclosure is not limited to this case.

Figure 4:
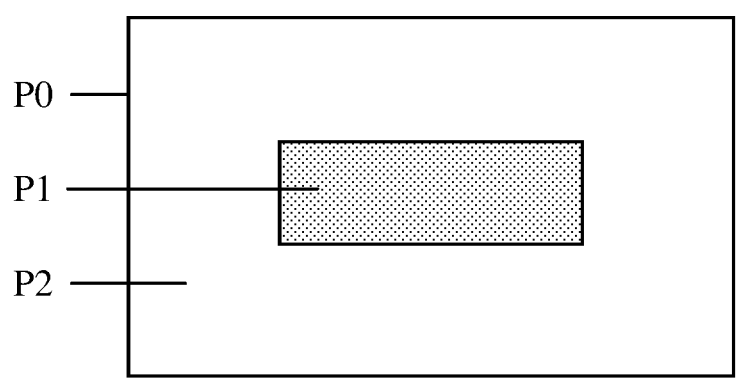
FIG. 4 is a schematic diagram of an operation of performing cutting processing on a first logo picture provided by some embodiments of the present disclosure.

For example, after determining the circumscribed rectangle frame of the logo, the first logo picture can be cut according to the circumscribed rectangle frame to obtain the second logo picture. FIG. 4 is a schematic diagram of an operation of performing cutting processing on a first logo picture provided by some embodiments of the present disclosure. For example, as shown in FIG. 4, a region P2 of the first logo picture P0 other than the circumscribed rectangle frame P1 of the logo can be cut and removed, while a region where the circumscribed rectangle frame P1 of the logo is located can be retained, so as to obtain the second logo picture (the content in the circumscribed rectangle frame P1 is the content of the second logo picture). It should be understood that, similar to the first logo picture, the second logo picture also includes the transparency channel information; the logo pattern in the second logo picture is opaque (that is, the corresponding transparency channel data is not 0), and the background in the second logo picture is transparent (that is, the corresponding transparency channel data is 0).

S140: performing data augmentation processing based on the second logo picture to obtain at least one third logo picture.

For example, the data augmentation processing includes at least one selected from a group consisting of scaling processing, color transformation processing, and rotation processing.

For example, in some embodiments, the second logo picture can be scaled with different magnification for many times to obtain a plurality of third logo pictures. For example, in some examples, each scaling processing can be equal proportion scaling, that is, the width and the height of the second logo picture are scaled by the same scaling coefficient; for example, in other examples, each scaling processing can be unequal proportion scaling, that is, the width and the height of the second logo picture are scaled according to different scaling factors. It should be noted that the scaling coefficient of each scaling processing can be set according to actual needs, and the embodiment of the present disclosure is not limited to this case. It should be understood that because the third logo picture needs to be pasted on the background picture in the subsequent step S150, the size of the third logo picture (i.e. the size of the circumscribed rectangle frame) is usually not larger than the size of the background picture, that is, the width and the height of the third logo picture are equal to or smaller than the width and the height of the background picture, respectively. It should also be noted that, in order to facilitate the detection and identification of the logo, the size of the third logo picture is usually moderate, not too large or too small.

For example, in some examples, the scaling processing can be implemented by an interpolation algorithm and the like, and the embodiments of the present disclosure include but are not limited to this case. For example, the interpolation algorithm can include interpolation, bilinear interpolation, bicubic interpolation, and other algorithms.

For example, in some embodiments, a plurality of different color transformation processing can be performed on the second logo picture to obtain the plurality of third logo pictures. For example, in some examples, each color transformation processing can transform some or all of the colors of the second logo picture into another color or colors. It should be understood that in the embodiment of the present disclosure, performing the color transformation processing on the second logo picture mainly refers to performing the color transformation processing on the opaque logo pattern in the second logo picture; in the process of color transformation processing, the process of the transparent background in the second logo picture can be omitted.

It should be noted that the color of the logo pattern of the third logo picture may include the background color of the standard logo picture. That is, although there may be the case that the logo pattern itself in the standard logo picture does not include the background color through the image editing processing in step S110, this case does not have any negative influence on the logo labeling method provided by the embodiment of the present disclosure, because the logo pattern can be converted back to the original color through the color transformation processing in step S140.

Figure 5:
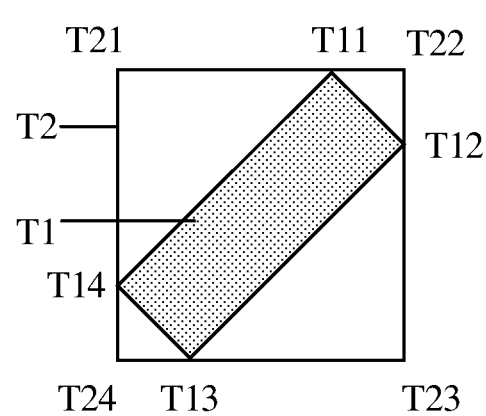
FIG. 5 is a schematic diagram of performing rotation processing on a second logo picture to obtain a third logo picture provided by some embodiments of the present disclosure.

For example, in some embodiments, the second logo picture can be rotated several times to obtain the plurality of third logo pictures. For example, in some examples, a center point of the second logo picture can be used as a rotation center, and the second logo picture can be rotated at different angles to obtain the plurality of third logo pictures. FIG. 5 is a schematic diagram of performing rotation processing on the second logo picture to obtain the third logo picture provided by some embodiments of the present disclosure. For example, as shown in FIG. 4, a picture T1 is a picture obtained by rotating the second logo picture by a certain angle, and coordinates of respective pixels in a picture P2 can be obtained by performing matrix transformation (using the rotation matrix) on the respective pixels of the second logo picture before rotation; and therefore, the coordinates (including an abscissa and an ordinate) of the four vertices T11, T12, T13, and T14 of the picture T1 can be determined. Furthermore, the coordinates, which are (u1, v1), (u1, v2), (u2, v1), and (u2, v2), of the four vertices of the picture P1 can be determined according to a minimum value u1 and a maximum value u2 of the abscissas and a minimum value v1 and a maximum value v2 of the ordinates of the four vertices T11, T12, T13, and T14, respectively. The rectangular region enclosed by the four vertices is a content region of the picture P1. For example, in the content region of the picture P1, the content of the region P2 (that is, the region where picture P2 is located) is consistent with the content of the picture P2, and regions other than the region P2 can be set as transparent regions (that is, the corresponding transparency channel data are all set to 0). Thereby, the third logo picture P2 can be obtained. It should be understood that because the third logo picture needs to be pasted on the background picture in the subsequent step S150, the size of the third logo picture obtained by the rotation processing is usually not larger than the size of the background picture, that is, the width and the height of the third logo picture obtained by the rotation processing are equal to or smaller than those of the background picture, respectively.

To sum up, when performing the scaling processing, it is necessary to calculate the size (i.e. the width and the height) of the picture obtained by performing the scaling processing according to the scaling coefficient of the scaling processing; when performing the color transformation processing, because the size of the picture does not change, it is not necessary to recalculate the size of the picture obtained by performing the color transformation processing, that is, the size of the picture before performing the color transformation processing can be taken as the size of the picture obtained by performing the color transformation processing; when performing the rotating processing, it is usually necessary to recalculate the size of the picture obtained by performing the rotating processing.

For example, in some embodiments, any two of a group consisting of the scaling processing, the color transformation processing, and the rotation processing can be performed on the second logo picture to obtain the plurality of third logo pictures. For example, in some embodiments, the scaling processing, the color transformation processing, and the rotation processing can be performed on the second logo picture to obtain the plurality of third logo pictures. It should be noted that in the case of combining two or three processing methods, the embodiments of the present disclosure are not limited to the order of various processing methods.

For example, in some embodiments, the second logo picture can be subjected to the data augmentation processing for 200~500 times, so as to correspondingly obtain 200~500 third logo pictures. For example, in some embodiments, the second logo picture itself (i.e. without the data augmentation processing) can be used as one third logo picture.

S150: acquiring a background picture, determining pasting position information of the at least one third logo picture in the background picture, and pasting the at least one third logo picture on the background picture according to the pasting position information to obtain at least one logo labeling picture.

For example, the background picture may include a photo taken and captured by a camera of a smart phone, a camera of a tablet computer, a camera of a personal computer, a lens of a digital camera, a surveillance camera, or a network camera, etc., and may include a person image, an animal or plant image, or a landscape image, etc., and the embodiments of the present disclosure are not limited to this case. For example, the background picture may also include a picture stored in the background picture library in advance; for example, the background picture may also include a picture obtained by other methods. For example, the background picture may be a color picture (e.g., a color picture in the RGB format, etc.) or a gray-scale picture, and the embodiment of the present disclosure is not limited to this case.

Figure 6:
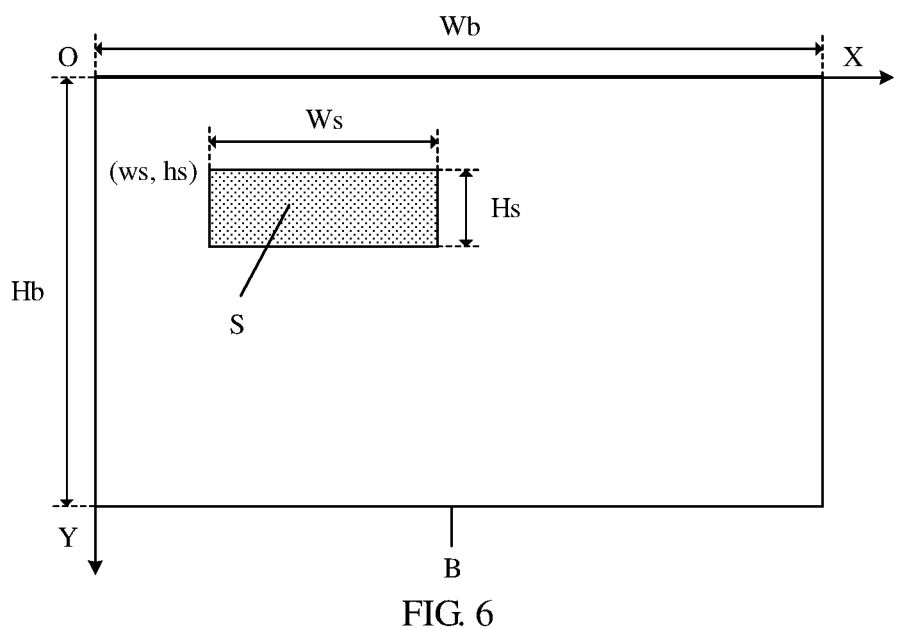
FIG. 6 is a schematic diagram of a pasting operation provided by some embodiments of the present disclosure.

FIG. 6 is a schematic diagram of a pasting operation provided by some embodiments of the present disclosure.

For example, in some embodiments, as shown in FIG. 6, a starting coordinate point (ws, hs) for pasting can be first determined in the background picture B. For example, the starting coordinate point corresponds to a first vertex (e.g., a top-left corner vertex) of the third logo picture S; by taking the case that the first vertex is the top-left corner vertex as an example, in this case, a value range of ws and a value range of hs satisfy the following requirement: $0 \leq ws \leq (Wb-Ws)$, $0 \leq hs \leq (Hb-Hs)$, where Wb and Hb respectively represent a width and a height of the background picture B, and Ws and Hs respectively represent a width and a height of the third logo picture S. Obviously, $Ws \leq Wb$ and $Hs \leq Hb$. For example, ws and hs are both randomly selected values within their respective value ranges, and the embodiments of the present disclosure are not limited to this case.

For example, in some embodiments, as shown in FIG. 6, after the starting coordinate point (ws, hs) is determined, the first vertex (e.g., the top-left corner vertex) of the third logo picture S can be overlapped with the starting coordinate point, and at the same time, the width direction and the height direction of the third logo picture S can be parallel to the width direction and the height direction of the background picture B, respectively, so as to paste the third logo picture S on the background picture B, thereby obtaining a corresponding logo labeling picture.

For example, in some embodiments, according to the data information of each color channel of the third logo picture S and the transparency channel information, the data information of the color channel of the background picture corresponding to the region where the third logo picture S is located can be transformed to obtain the data information of each color channel of the logo labeling picture. For example, in some examples, the data information of any color channel (e.g., the red channel, the green channel, and the blue channel) of the logo labeling picture corresponding to the logo pattern in the third logo picture S is the data information of any color channel of the logo pattern in the third logo picture S, and the data information of any color channel of the logo labeling picture except the region where the logo pattern is located is the data information of any color channel of the corresponding background picture B. For example, as far as the visual effect of the logo labeling picture is concerned, it is equivalent to that the logo pattern in the third logo picture S (the logo pattern in the third logo picture S is opaque and the background in the third logo picture S is transparent) covers the original content of the background picture B in the region where the logo pattern is located, while the remaining regions of the background picture B all present the original content of the background picture B.

For example, in some examples, as shown in FIG. 6, the labeling information of the logo labeling picture can be expressed as [id, (ws+Ws/2)/Wb, (hs+Hs/2)/Hb, Ws/Wb, Hs/Hb], where id is a label of the logo pattern, (ws+Ws/2)/Wb is an abscissa of a normalized center position of a real bounding box of the logo pattern, (hs+Hs/2)/Hb is an ordinate of the normalized center position of the real bounding box of the logo pattern, Ws/Wb is a width of the real bounding box of the logo pattern, and Hs/Hb is a height of the real bounding box of the logo pattern. For example, in other examples, the labeling information of the logo labeling picture can also be expressed as [id, ws/Wb, hs/Hb, (ws+Ws)/Wb, (hs+Hs)/Hb], where id is the label of the logo pattern, (ws/Wb, hs/Hb) are coordinates of a normalized position of the first vertex (e.g., the left-top corner vertex) of the real bounding box of the logo pattern, ((ws+Ws)/Wb, (hs+Hs)/Hb) are coordinates of a normalized position of another vertex (for example, a right-lower corner vertex), opposite to the first vertex, of the real bounding box of the logo pattern. It should be noted that the embodiments of the present disclosure include but are not limited to this case.

For example, in other embodiments, as shown in FIG. 6, a central coordinate point (ws0, hs0) for pasting can be determined in the background picture B first, and then the central point of the third logo picture S is overlapped with the central coordinate point, and at the same time, the width direction and the height direction of the third logo picture S are parallel to the width direction and the height direction of the background picture B, respectively, so that the third logo picture S can be pasted on the background picture B, and the corresponding logo labeling picture can be obtained. In this case, the value range of ws0 and the value range of hs0 satisfy: $Ws/2 \leq ws0 \leq (Wb-Ws/2)$, $Hs/2 \leq hs0 \leq (Hb-Hs/2)$, where Wb and Hb respectively represent the width and the height of the background picture B, and Ws and Hs respectively represent the width and the height of the third logo picture S. Obviously, $Ws \leq Wb$ and $Hs \leq Hb$. For example, ws0 and hs0 are both randomly selected values within their respective value ranges, and the embodiments of the present disclosure are not limited to this case. Accordingly, the labeling information of the logo labeling picture can be expressed as [id, ws0/Wb, hs0/Hb, Ws/Wb, Hs/Hb], where id is the label of the logo pattern, ws0/Wb is an abscissa of a normalized center position of a real bounding box of the logo pattern, hs0/Hb is an ordinate of the normalized center position of the real bounding box of the logo pattern, Ws/Wb is a width of the real bounding box of the logo pattern, and Hs/Hb is a height of the real bounding box of the logo pattern. It should be noted that the embodiments of the present disclosure include but are not limited to this case.

It should be understood that in the embodiments of the present disclosure, a plurality of pasting operations can be achieved by selecting at least one of the following three items: (1) selecting different third logo pictures; (2) selecting different background pictures; (3) selecting different starting coordinate points (or central coordinate points). Furthermore, a plurality of logo labeling pictures can be obtained. For example, the plurality of logo labeling pictures can be added to the training data set to perfect the training data set.

For example, in some embodiments, the above logo labeling method may further include the step S160: adding the at least one logo labeling picture into a first training data set to obtain a second training data set.

For example, both the first training data set and the second training data set include a large number of labeled logo pictures, the large number of labeled logo pictures correspond to a plurality of logos, and one logo can correspond to a plurality of labeled logo pictures, and the various logos form a logo library. For example, the first training data set does not include the at least one logo labeling picture, and the second training data set includes the at least one logo labeling picture. For example, the logo library corresponding to the first training data set does not include the logo corresponding to the at least one logo labeling picture, so that in step S160, the logo corresponding to the at least one logo labeling picture can also be added into the logo library corresponding to the first training data set to obtain the logo library corresponding to the second training data set, that is, the logo library corresponding to the second training data set includes the logo corresponding to the at least one logo labeling picture.

For example, the first training data set is used to train a target detection model to obtain a first training model. Because the logo corresponding to the at least one logo labeling picture is not recorded in the logo library corresponding to the first training data set, the first training model often cannot identify and detect the logo corresponding to the at least one logo labeling picture.

For example, the second training data set is used to update the target training model to obtain a second training model. The second training model can identify and detect the logo corresponding to the at least one logo labeling picture.

It should be noted that in the embodiment of the present disclosure, the flow of the above logo labeling method may include more or less operations, and these operations may be executed sequentially or in parallel. Although the flow of the logo labeling method described above includes a plurality of operations in a specific order, it should be clearly understood that the order of the plurality of operations is not limited.

According to the logo labeling method provided by the embodiments of the present disclosure, the logo (including the transparency channel information) can be automatically extracted from the standard logo picture, and then the data augmentation processing is performed on the logo, and the logo labeling picture (including the labeling information) is obtained through pasting, so that the training data set can be perfected.

Figure 7:
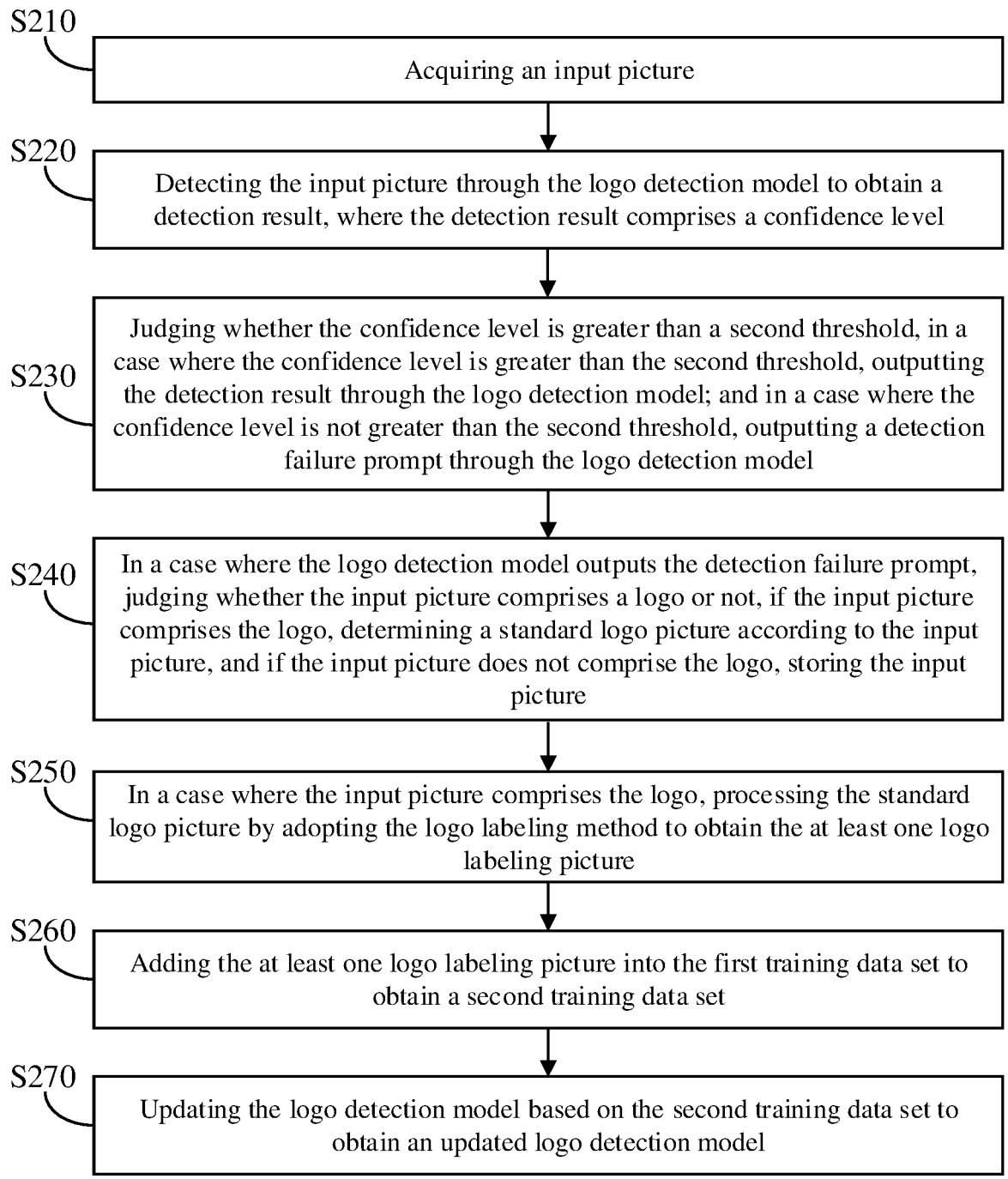
FIG. 7 is a flowchart of an update method of a logo detection model provided by some embodiments of the present disclosure.

Some embodiments of the present disclosure also provide an update method of a logo detection model. FIG. 7 is a flowchart of an update method of a logo detection model provided by some embodiments of the present disclosure. For example, as shown in FIG. 7, the update method includes the following steps S210 to S250.

S210: acquiring an input picture.

For example, the input picture can be a picture to be detected uploaded by the user terminal, and may or may not include a logo pattern. For example, the input picture may include a photo taken and captured by a camera of a smart phone, a camera of a tablet computer, a camera of a personal computer, a lens of a digital camera, a surveillance camera, a network camera, etc., and may include a person image, an animal or plant image, or a landscape image, etc., and the embodiments of the present disclosure are not limited to this case. For example, the input picture may also include a picture obtained by other methods. For example, the input picture may be a color picture (e.g., a color picture in the RGB format, etc.) or a gray-scale picture, and the embodiment of the present disclosure do not limit this.

S220: detecting the input picture through the logo detection model to obtain a detection result, where the detection result comprises a confidence level.

For example, the logo detection model in step S220 can be implemented by using any of the aforementioned common target detection algorithms/models. For example, in some examples, a common target detection model can be trained from scratch by using the first training data set to obtain a trained target detection model; for example, the first training data set includes a large number of labeled logo pictures, the large number of labeled logo pictures correspond to a plurality of logos, one logo can correspond to a plurality of labeled logo pictures, a plurality of logos form a logo library, and the logo library corresponds to the current trained target detection model; accordingly, the trained target detection model is a logo detection model that can be used to identify and detect logos. It should be understood that the logo detection model can usually only identify and detect logos that have been recorded in the logo library.

For example, in some embodiments, the logo detection model may adopt a YOLO model, and the embodiments of the present disclosure include but are not limited to this case. When the YOLO model performs detection, the YOLO model can provide end-to-end prediction only by one convolution neural network operation, and the YOLO model has the advantages of fast operation speed and high prediction accuracy. For example, in some examples, the logo detection model may further adopt the YOLO-v5 model in the YOLO model, and the embodiments of the present disclosure include but are not limited to this case.

For example, in some embodiments, the detection result of the logo detection model may include a probability and a position of the logo included in the input picture. For example, in some examples, the detection result of the logo detection model can be expressed as [L0, X0, Y0, W0, H0], where L0 is the confidence level, which is a value in an interval between [0, 1], the confidence level can characterize the probability that the predicted bounding box has a logo, and can also characterize the intersection over union (IOU) between the predicted bounding box and the real bounding box, (X0, Y0) represent coordinates of a normalized center position of the predicted bounding box, and W0 and H0 represent a normalized width and a normalized height of the predicted bounding box, respectively. For example, the detection result of the YOLO-v5 model is generally the detection result in the above-mentioned form. For example, in other examples, the detection result of the logo detection model can also be expressed as [L0, X1, Y1, X2, Y2], where L0 is the confidence level, and (X1, Y1) and (X2, Y2) respectively represent normalized position coordinates of two vertices, located at two ends of a certain diagonal line, of the predicted bounding box. For example, taking a case where (X1, Y1) and (X2, Y2) respectively represent a coordinate of a top-left corner vertex and a coordinate of a lower right corner vertex of the predicted bounding box as an example, then X0=(X1+X2)/2, Y0=(Y1+Y2)/2, W0=X2−X1, and H0=Y2−Y1. It should be noted that the embodiments of the present disclosure do not limit the expression form of the detection result of the logo detection model.

S230: judging whether the confidence level is greater than a second threshold, in a case where the confidence level is greater than the second threshold, outputting the detection result through the logo detection model; and in a case where the confidence level is not greater than the second threshold, outputting a detection failure prompt through the logo detection model.

For example, the second threshold can be set according to actual needs. For example, in some examples, the value range of the second threshold can be set to [0.25, 0.35], for example; for example, in some examples, the value of the second threshold may be set to, for example, 0.3 or the like. It should be noted that the embodiments of the present disclosure include but are not limited to this case.

For example, if the confidence level is greater than the second threshold, it can be considered that the logo detection model has detected the logo recorded in the logo library in the input picture; accordingly, outputting the detection result may include providing various related information of the logo to the user terminal, and the various related information includes but is not limited to the name of the logo, encyclopedia content of the logo, etc.

For example, if the confidence level is not greater than the second threshold, it can be considered that the logo detection model fails to detect the logo recorded in the logo library in the input picture, that is, the detection failure. There are two reasons for the detection failure: first, the input picture includes the real logo, but the logo is not recorded in the logo library; second, the input picture does not include the real logo.

For example, in some embodiments, in the case of the detection failure, outputting the detection failure prompt may include outputting the first detection failure prompt to the user terminal, which may specifically include the following methods: (1) outputting "error detection" information to inform the user terminal that the logo in the current input picture is not recorded in the logo library, and at the same time, to inform the user terminal that it can choose to view the approximate logo result; (2) outputting "unrecognized" information to inform the user terminal that the logo in the current input picture is not recorded in the logo library, and there is no similar logo; (3) outputting "detection failure" information to inform the user terminal that the logo in the current input picture is not recorded in the logo library, and at the same time, to inform the user terminal that it can wait for a certain time (for example, 1 hour or 2 hours, etc.) and check the detection result again after the system is automatically updated. It should be noted that the above three methods of outputting the first detection failure prompt to the user terminal are all exemplary. In the practical application, the logo detection model can output the first detection failure prompt to the user terminal in any feasible method, and the embodiments of the present disclosure are not limited to this case.

For example, in some embodiments, in the case of detection failure, outputting the detection failure prompt may further include outputting a second detection failure prompt to the operation and maintenance terminal to remind the operation and maintenance personnel to handle it accordingly. It should be noted that, in the practical application, the logo detection model can output the second detection failure prompt to the user terminal in any feasible method, and the embodiments of the present disclosure do not limit this.

S240: in a case where the logo detection model outputs the detection failure prompt, judging whether the input picture comprises a logo or not, if the input picture comprises the logo, determining a standard logo picture according to the input picture, and if the input picture does not comprise the logo, storing the input picture.

For example, when the logo detection model outputs the detection failure prompt, the operation and maintenance personnel can download the input picture for viewing according to the detection failure prompt received by the operation and maintenance terminal, and then judge whether the input picture includes the logo (for example, the real logo) or not. If the input picture includes the real logo, the operation and maintenance personnel can edit the input picture to get the standard logo picture that meets the requirements; of course, the operation and maintenance personnel can also obtain the standard logo picture that meet the requirements by searching, seeking, and other methods. If the input picture does not include the real logo, the operation and maintenance personnel can store the input picture without performing any other processing on the input picture; for example, the input picture can be stored in the background picture library, so that the input picture can be used as the background picture in the aforementioned step S150.

It should be noted that, for the standard logo picture in step S240, reference can be made to the related description in the above-mentioned step S110, and the repetition description is not repeated herein again.

S250: in a case where the input picture comprises the logo, processing the standard logo picture by adopting the logo labeling method to obtain the at least one logo labeling picture.

For example, the logo labeling method in step S250 can be the logo labeling method provided by any embodiment of the present disclosure, and for the specific implementation process and details of step S250, reference can be made to the related descriptions of steps S110 to S150, which are not repeated here.

S260: adding the at least one logo labeling picture into the first training data set to obtain a second training data set.

For example, both the first training data set and the second training data set include a large number of labeled logo pictures, the large number of labeled logo pictures correspond to a plurality of logos, and one logo can correspond to a plurality of labeled logo pictures, and the various logos form a logo library (logo library). For example, the first training data set does not include the at least one logo labeling picture, and the second training data set includes the at least one logo labeling picture. For example, the logo library corresponding to the first training data set does not include the logo corresponding to the at least one logo labeling picture, so that in step S260, the logo corresponding to the at least one logo labeling picture can also be added into the logo library corresponding to the first training data set to obtain the logo library corresponding to the second training data set, that is, the logo library corresponding to the second training data set includes the logo corresponding to the at least one logo labeling picture.

For example, the specific implementation process and details of step S260 can also refer to the related description of step S160, and details are not repeated here.

S270: updating the logo detection model based on the second training data set to obtain an updated logo detection model.

For example, the logo detection model before updating is trained based on the first training data set. Because the logo corresponding to the at least one logo labeling picture is not recorded in the logo library corresponding to the first training data set, the logo detection model before updating often cannot identify and detect the logo corresponding to the at least one logo labeling picture. For example, the updated logo detection model can identify and detect the logo corresponding to the at least one logo labeling picture. Therefore, compared with the logo detection model before updating, the detection performance of the updated logo detection model is stronger.

It should be understood that the process of updating the logo detection model is essentially a training process. Therefore, the updating process can refer to common training methods, so the repetition is not repeated herein again.

The update method of the logo detection model provided by the embodiments of the present disclosure can improve and perfect the training data set according to the above-mentioned logo labeling method when the logo detection model fails to detect, and then can update the logo detection model based on the improved training data set, so as to improve the detection performance of the logo detection model.

Figure 8:
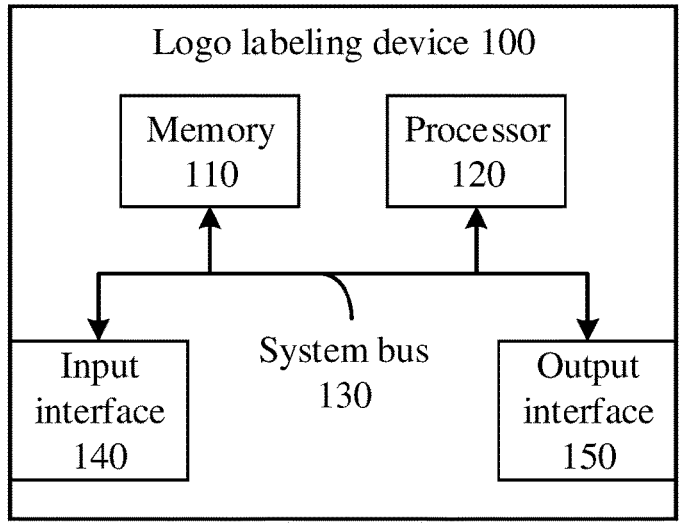
FIG. 8 is a schematic block diagram of a logo labeling device provided by some embodiments of the present disclosure.

Some embodiments of the present disclosure also provide a logo labeling device. FIG. 8 is a schematic block diagram of a logo labeling device provided by some embodiments of the present disclosure. For example, as shown in FIG. 8, the logo labeling device 100 includes a memory 110 and a processor 120.

For example, the memory 110 is used to store computer-readable instructions non-temporarily, the processor 120 is used to execute the computer-readable instructions, and the computer-readable instructions are executed by the processor 120 to execute the logo labeling method provided by any embodiment of the present disclosure.

For example, the memory 110 and the processor 120 can communicate with each other directly or indirectly. For example, in some examples, as shown in FIG. 2, the logo labeling device 100 may further include a system bus 130, the memory 110 and the processor 120 can communicate with each other through the system bus 130, for example, the processor 120 can access the memory 110 through the system bus 130. For example, in other examples, components, such as the memory 110 and the processor 120, can communicate with each other through a network connection. The network may include a wireless network, a wired network, and/or any combination of the wireless network and the wired network. The network may include a local area network, the Internet, a telecommunication network, an Internet of Things based on the Internet and/or the telecommunication network, and/or any combination of the above networks, and the like. The wired network can communicate by means of twisted pair, coaxial cable, optical fiber transmission, or the like, and the wireless network can communicate by using a 3G/4G/5G mobile communication network, Bluetooth, Zigbee, or WiFi, etc. The present disclosure does not limit the types and functions of the network.

For example, the processor 120 may control other components in the logo labeling device 100 to perform desired functions. The processor 120 can be a central processing unit (CPU), a tensor processing unit (TPU), a graphics processing unit (GPU), and other devices with data processing capability and/or program execution capability. The central processing unit (CPU) can be X86 or ARM architecture, etc. The GPU can be individually and directly integrated into the motherboard, or built into the Northbridge chip of the motherboard. The GPU can also be built into the central processing unit (CPU).

For example, the memory 110 may include any combination of one or more computer program products, and the computer program products may include various forms of computer-readable storage media, such as volatile memory and/or non-volatile memory. The volatile memory may include, for example, a random access memory (RAM) and/or a cache, etc. The non-volatile memory can include, for example, a read-only memory (ROM), a hard disk, an erasable programmable read-only memory (EPROM), a portable compact disk read-only memory (CD-ROM), an USB memory, a flash memory, etc.

For example, one or more computer instructions may be stored on the memory 110, and the processor 120 may run the computer instructions to implement various functions. The computer-readable storage medium can also store various applications and various data, such as the standard logo picture, the first logo picture, the second logo picture, the third logo picture, the logo labeling picture, and various data used and/or generated by the applications.

For example, some computer instructions stored in the memory 110, when executed by the processor 120, can perform one or more steps of the logo labeling method described above.

For example, as shown in FIG. 14, the logo labeling device 100 may further include an input interface 140 that allows external devices to communicate with the logo labeling device 100. For example, the input interface 140 can be used to receive instructions or data (e.g., input images, video sequences, etc.) from an external computer device, from a user, etc. The logo labeling device 100 may further include an output interface 150 for interconnecting the logo labeling device 100 and one or more external devices. For example, the logo labeling device 100 can output a logo labeling result (e.g., the logo labeling picture and labeling information thereof) and the like through the output interface 150. The external device that communicates with the logo labeling device 100 through the input interface 140 and the output interface 150 may be included in an environment that provides any type of user interface with which a user can interact. Examples of the type of the user interface include a graphical user interface, a natural user interface, etc. For example, the graphical user interface can accept input from a user using an input device, such as a keyboard, a mouse, a remote controller, etc., and provide output on an output device, such as a display. In addition, the natural user interface may enable the user to interact with the logo labeling device 100 in a way that does not need to be constrained by the input device, such as a keyboard, a mouse, a remote controller, etc. On the contrary, the natural user interface can rely on a speech recognition, a touch and stylus recognition, a gesture recognition on and near the screen, a gesture in the air, head and eye tracking, voice and semantics, vision, touch, a gesture, a machine intelligence, and the like.

In addition, although the logo labeling device 100 is shown as a single system in FIG. 14, it can be understood that the logo labeling device 100 can also be a distributed system and can also be arranged as a cloud facility (including a public cloud or a private cloud). Therefore, for example, several devices can communicate through the network connection and can jointly perform the task described as being performed by the logo labeling device 100. For example, the detailed description of the implementation process of the logo labeling method, reference may be made to the related description in the above embodiments of the logo labeling method, and the repeated parts are not repeated herein again.

For example, in some examples, the logo labeling device may include, but is not limited to, a smart phone, a notebook computer, a tablet computer, a personal computer, a server, and the like.

It should be noted that the logo labeling device provided by the embodiments of the present disclosure is exemplary, but not restrictive. According to the actual application needs, the logo labeling device may also include other conventional components or structures. For example, in order to achieve the necessary functions of the logo labeling device, those skilled in the art may set other conventional components or structures according to specific application scenarios, and the embodiments of the present disclosure are not limited to this case.

For the technical effect of the logo labeling device provided by the embodiment of the present disclosure, reference may be made to the corresponding description of the logo labeling method in the above embodiments, and the repetition will not be repeated herein again.

For example, in some embodiments, an input image or video sequence can be obtained through a client-side and uploaded to a server; after the server performs the image processing process based on the received input image or video sequence, the server returns the corrected blackboard-writing region image or the corrected blackboard-writing region video sequence (that is, the corrected blackboard-writing region image corresponding to each frame image of the video sequence) to the client-side to provide the corrected blackboard-writing region image or the corrected blackboard-writing region video sequence to the user.

Figure 9:
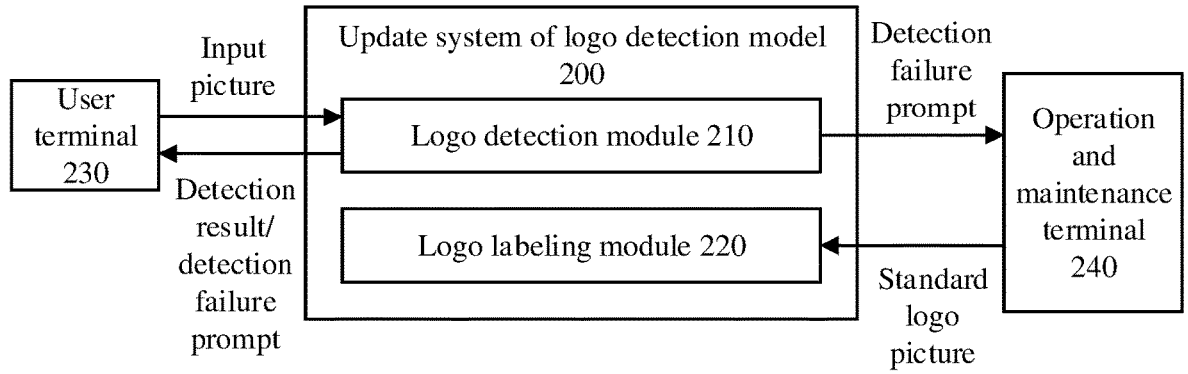
FIG. 9 is a schematic block diagram of an update system of a logo detection model provided by some embodiments of the present disclosure.

Some embodiments of the present disclosure also provide an update system of a logo detection model. FIG. 9 is a schematic block diagram of an update system of a logo detection model provided by some embodiments of the present disclosure. For example, as shown in FIG. 9, the update system 200 includes a logo detection module 210 and a logo labeling module 220.

For example, the logo detection module 210 is configured to acquire an input picture; detect the input picture through the logo detection model to obtain a detection result, where the detection result comprises a confidence level; and judge whether the confidence level is greater than a second threshold, in a case where the confidence level is greater than the second threshold, output the detection result through the logo detection model, and in a case where the confidence level is not greater than the second threshold, output a detection failure prompt through the logo detection model. That is, the logo detection module 210 can be used to execute steps S210 to S230 in the aforementioned update method, and for the specific implementation process and details, reference may be made to the aforementioned related description, and the specific implementation process and details are not repeated here.

For example, in some embodiments, as shown in FIG. 9, the update system 200 may be communicatively connected with the user terminal 230. On one hand, the user can upload the picture to be detected through the user terminal 230, and the picture to be detected is used as the input picture of the logo detection module 210; on the other hand, the user can also receive the detection result/detection failure prompt returned by the logo detection module 210 through the user terminal 230 (refer to the aforementioned first detection failure prompt).

For example, in some embodiments, as shown in FIG. 9, the update system 200 may also be communicatively connected with the operation and maintenance terminal 240. The logo detection module 210 may output a detection failure prompt (refer to the aforementioned first detection failure prompt) to the operation and maintenance terminal 240. The operation and maintenance personnel can download the input picture for viewing according to the detection failure prompt received by the operation and maintenance terminal 240, and then judge whether the input picture includes a logo (for example, a real logo). If the input picture includes the real logo, the operation and maintenance personnel can edit the input picture to obtain the standard logo picture that meets the requirements; of course, the operation and maintenance personnel can also obtain the standard logo picture that meets the requirements by searching, seeking, and other methods. If the input picture does not include the real logo, the operation and maintenance personnel can store the input picture without any other processing; for example, the input picture can be stored in the background picture library and used as the background picture.

For example, the logo labeling module 240 is configured to process a standard logo picture, which is obtained based on the input picture, by adopting the logo labeling method, to obtain the at least one logo labeling picture; add the at least one logo labeling picture into the first training data set to obtain a second training data set; and trigger an operation of updating the logo detection model based on the second training data set. That is, the logo detection module 240 can be used to execute step S250 (step S250 can refer to step S110 to step S150) and step S260 (step S260 can refer to step S160) in the aforementioned update method, and for the specific implementation process and details, reference may be made to the aforementioned related descriptions, which is not repeated herein again. In addition, the logo detection module 240 may also trigger the update operation in step S270.

For example, in some embodiments, the update system 200 may further include an update module 250 (not shown in FIG. 9). For example, the update module 250 is configured to update the logo detection model based on the second training data set to obtain an updated logo detection model. That is, the update module 250 can be used to execute step S270 in the aforementioned update method, and for the specific implementation process and details, reference may be made to the aforementioned related description, which is not repeated here.

It should be noted that the logo detection module 210, the logo labeling module 220, the update module 250, and the like in the above-mentioned update system 200 can all be implemented by software, hardware, firmware, or any combination thereof. For example, the logo detection module 210, the logo labeling module 220, and the update module 250 can be implemented as a logo detection circuit 210, a logo labeling circuit 220, and an update circuit 250, respectively. It should be noted that the embodiments of the present disclosure do not limit their specific implementations.

It should be noted that in the embodiments of the present disclosure, the update system 200 may include more or less software, hardware, and firmware, and the connection relationship among the various software, hardware, and firmware is not limited and may be determined according to the actual requirements. The specific configurations of the various software, hardware, and firmware are not limited, and the various software, hardware, and firmware may be constituted by digital chips, by a combination of a processor and a memory, or by other suitable modes.

The update system 200 of the logo detection model provided by the embodiment of the present disclosure can be widely applied to various logo recognition and detection scenarios. For example, in some examples, the update system 200 can achieve logo recognition of media advertisements, perform data management according to logo brands and category labels, achieve to automatically label the advertising videos to facilitate the retrieval of the advertising materials; compared with manual labeling, due to human factors, different people will label the same category with different labels, such as for clothing advertisements, and many synonym labels, such as clothing, dress, garment, and the like, will appear, which is inconvenient to manage. However, the update system 200 can achieve automatic labeling, and the labeled labels are prescribed fixed labels, thus avoiding the above problems existing in the manual labeling process. For example, in some examples, the update system 200 can be used for trademark registration inquiry; for example, the logo picture to be detected can be input into the update system 200, and it can be queried whether the same or similar logo exists, which is convenient to modify the logo scheme and avoid infringement. For example, in some examples, the update system 200 can be applied to a logo design company; for example, the designer can input the designed logo picture into the update system 200 to check whether there are identical or similar logos, which is convenient for the designer to analyze the existing logos and make appropriate modifications to assist the designer to complete the design; in addition, designers can search the logo design of similar brands in a fuzzy way through the category labels to assist designers to complete the design. For example, in some examples, the update system 200 can be applied to a business scenario where the brand information needs to be quickly acquired; for example, a logo picture can be obtained by taking a photo, and then the logo picture can be uploaded to the update system 200, and then the brand information is received, and the corresponding brand Baidu Encyclopedia (or other introduction web pages about the brand) is matched to obtain the relevant information about the brand. For example, in some examples, the update system 200 can be used for a media platform to build its own brand Logo library; for example, the media platform can filter platform-independent advertising content based on the commodity information identified by the update system 200. It should be noted that the embodiments of the present disclosure include but are not limited to this case.

It should be understood that the update system 200 provided by the embodiment of the present disclosure can be used to execute the aforementioned update method, and therefore, can also achieve the same technical effect as the aforementioned update method, which will not be repeated here.

Figure 10:
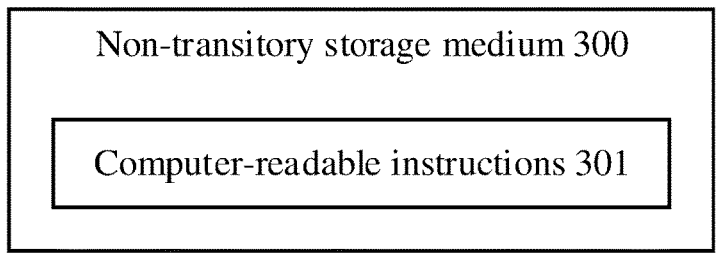
FIG. 10 is a schematic block diagram of a storage medium provided by some embodiments of the present disclosure.

At least some embodiment of that present disclosure also provide a non-transitory storage medium. FIG. 10 is a schematic block diagram of a non-transitory storage medium provided by some embodiments of the present disclosure. For example, as shown in FIG. 10, the non-transitory storage medium 300 stores computer-readable instructions 301 non-transiently, and when the computer-readable instructions 301 are executed by a computer (including a processor), the logo labeling method provided by any embodiment of the present disclosure can be executed.

For example, one or more computer instructions may be stored on the non-transitory storage medium 300. Some computer instructions stored on the non-transitory storage medium 300 may be, for example, instructions for implementing one or more steps in the above-mentioned logo labeling method. Other computer instructions stored on the non-transitory storage medium 300 may be, for example, instructions for implementing one or more steps in the above-mentioned update method.

For example, the non-transitory storage medium may include a storage component of a smart phone, a storage component of a tablet computer, a hard disk of a personal computer, a random access memory (RAM), a read-only memory (ROM), an erasable programmable read-only memory (EPROM), a compact disk read-only memory (CD-ROM), a flash memory, or any combination of the above storage media, or other suitable storage media. For example, the non-transitory storage medium can also be the memory 110 shown in FIG. 8, and the related description can refer to the foregoing content, which is not repeated here.

For the technical effect of the non-transitory storage medium provided by the embodiment of that present disclosure, reference may be made to the corresponding description of the logo labeling method in the above embodiments, which is not repeated here.

For the present disclosure, the following statements should be noted:

(1) The accompanying drawings of the embodiment(s) of the present disclosure involve only the structure(s) in connection with the embodiment(s) of the present disclosure, and other structure(s) can be referred to common design(s).

(2) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto. Any modifications or substitutions easily occur to those skilled in the art within the technical scope disclosed in the present disclosure should be within the protection scope of the present disclosure. Therefore, the protection scope of the present disclosure should be based on the protection scope of the claims.

What is claimed is:

1. A logo labeling method, comprising:
    acquiring a standard logo picture, wherein the standard logo picture comprises a logo;
    based on the standard logo picture, determining transparency channel information corresponding to the standard logo picture to obtain a first logo picture, wherein the first logo picture comprises the transparency channel information;
    determining a circumscribed rectangle frame of the logo in the first logo picture based on the transparency channel information, and performing cutting processing on the first logo picture according to the circumscribed rectangle frame to obtain a second logo picture, wherein the second logo picture comprises the logo;
    performing data augmentation processing based on the second logo picture to obtain at least one third logo picture; and
    acquiring a background picture, determining pasting position information of the at least one third logo picture in the background picture, and pasting the at least one third logo picture on the background picture according to the pasting position information to obtain at least one logo labeling picture.

2. The logo labeling method according to claim 1, wherein based on the standard logo picture, determining the transparency channel information corresponding to the standard logo picture to obtain the first logo picture, comprises:
    obtaining a standard logo gray-scale picture according to the standard logo picture;
    judging a size relationship between a gray-scale value of each pixel in the standard logo gray-scale picture and a first threshold to determine transparency channel data corresponding to each pixel in the standard logo gray-scale picture, and further to obtain the transparency channel information corresponding to the standard logo picture; and
    combining data information of the standard logo picture with the transparency channel information to obtain the first logo picture.

3. The logo labeling method according to claim 2, wherein in the first logo picture, transparency channel data corresponding to the logo is not zero, and all other transparency channel data except the transparency channel data corresponding to the logo is zero.

4. The logo labeling method according to claim 3, wherein determining the circumscribed rectangle frame of the logo in the first logo picture based on the transparency channel information, comprises:
    in the transparency channel information, searching and determining an abscissa w1 of a pixel, whose value is not zero and which is a first one of all pixels whose values are not zero in a row direction, in the row direction, an abscissa w2 of a pixel, whose value is not zero and which is a last one of the all pixels whose values are not zero in the row direction, in the row direction, an ordinate h1 of a pixel, whose value is not zero and which is a first one of all pixels whose values are not zero in a column direction, in the column direction, and an ordinate h2 of a pixel, whose value is not zero and which is a last one of the all pixels whose values are not zero in the column direction, in the column direction to determine the circumscribed rectangle frame, wherein coordinates of four vertices of the circumscribed rectangle frame are (w1, h1), (w1, h2), (w2, h1), and (w2, h2), respectively.

5. The logo labeling method according to claim 1, wherein the data augmentation processing comprises at least one selected from a group consisting of scaling processing, color transformation processing, and rotation processing.

6. The logo labeling method according to claim 1, wherein determining the pasting position information of the at least one third logo picture in the background picture, and pasting the at least one third logo picture on the background picture according to the pasting position information to obtain the at least one logo labeling picture, comprises:
    for each third logo picture of the at least one third logo picture:
    determining a starting coordinate point (ws, hs) for pasting in the background picture, wherein a value range of ws and a value range of hs satisfy: $0 \le ws \le (Wb-Ws)$, $0 \le hs \le (Hb-Hs)$, Wb and Hb respectively represent a width and a height of the background picture, and Ws and Hs respectively represent a width and a height of the third logo picture; and
    overlapping a first vertex of the third logo picture with the starting coordinate point, and simultaneously enabling a width direction and a height direction of the third logo picture to be parallel to a width direction and a height direction of the background picture, respectively, so as to paste the third logo picture on the background picture to obtain a logo labeling picture corresponding to the third logo picture, thereby obtaining the at least one logo labeling picture.

7. The logo labeling method according to claim 6, wherein labeling information of the at least one logo labeling picture is expressed as [id, (ws+Ws/2)/Wb, (hs+Hs/2)/Hb, Ws/Wb, Hs/Hb],
    wherein id is a label of the logo, (ws+Ws/2)/Wb is an abscissa of a normalized center position of a real bounding box of the logo, (hs+Hs/2)/Hb is an ordinate of the normalized center position of the real bounding box of the logo, Ws/Wb is a width of the real bounding box of the logo, and Hs/Hb is a height of the real bounding box of the logo.

8. The logo labeling method according to claim 1, wherein determining the pasting position information of the at least one third logo picture in the background picture, and pasting the at least one third logo picture on the background picture according to the pasting position information to obtain the at least one logo labeling picture, comprises:
    for each third logo picture of the at least one third logo picture;
    determining a central coordinate point (ws0, hs0) for pasting in the background picture, wherein a value range of ws0 and a value range of hs0 satisfy: $Ws/2 \le ws0 \le (Wb-Ws/2)$, $Hs/2 \le hs0 \le (Hb-Hs/2)$, Wb and Hb respectively represent a width and a height of the background picture, and Ws and Hs respectively represent a width and a height of the third logo picture; and
    overlapping a central point of the third logo picture with the central coordinate point, and simultaneously enabling a width direction and a height direction of the third logo picture to be parallel to a width direction and a height direction of the background picture, respectively, so as to paste the third logo picture on the background picture to obtain a logo labeling picture corresponding to the third logo picture, thereby obtaining the at least one logo labeling picture.

9. The logo labeling method according to claim 8, wherein labeling information of the at least one logo labeling picture is expressed as [id, ws0/Wb, hs0/Hb, Ws/Wb, Hs/Hb], wherein id is a label of the logo, ws0/Wb is an abscissa of a normalized center position of a real bounding box of the logo, hs0/Hb is an ordinate of the normalized center position of the real bounding box of the logo, Ws/Wb is a width of the real bounding box of the logo, and Hs/Hb is a height of the real bounding box of the logo.

10. The logo labeling method according to claim 1, wherein a foreground of the standard logo picture is the logo, a background of the standard logo picture is a solid color background, and a color of the logo does not comprise a color of the solid color background.

11. The logo labeling method according to claim 1, further comprising:

adding the at least one logo labeling picture into a first training data set to obtain a second training data set.

12. An update method of a logo detection model, comprising:

acquiring an input picture;

detecting the input picture through the logo detection model to obtain a detection result, wherein the detection result comprises a confidence level; and judging whether the confidence level is greater than a second threshold,
in a case where the confidence level is greater than the second threshold, outputting the detection result through the logo detection model,
in a case where the confidence level is not greater than the second threshold, outputting a detection failure prompt through the logo detection model;

in a case where the logo detection model outputs the detection failure prompt, judging whether the input picture comprises a logo or not,
if the input picture comprises the logo, determining a standard logo picture according to the input picture,
if the input picture does not comprise the logo, storing the input picture;

in a case where the input picture comprises the logo;

based on the standard logo picture determining transparency channel information corresponding to the standard logo picture to obtain a first logo picture, wherein the first logo picture comprises the transparency channel information;

determining a circumscribed rectangle frame of the logo in the first logo picture based on the transparency channel information, and performing cutting processing on the first logo picture according to the circumscribed rectangle frame to obtain a second logo picture, wherein the second logo picture comprises the logo;

performing data augmentation processing based on the second logo picture to obtain at least one third logo picture; and acquiring a background picture, determining pasting position information of the at least one third logo picture in the background picture, and pasting the at least one third logo picture on the background picture according to the pasting position information to obtain at least one logo labeling picture;

adding the at least one logo labeling picture into a first training data set to obtain a second training data set; and updating the logo detection model based on the second training data set to obtain an updated logo detection model.

13. The update method according to claim 12, wherein the logo detection model is a YOLO-v5 model trained based on the first training data set.

14. The update method according to claim 12, wherein a value range of the confidence level is [0, 1], and a value range of the second threshold is [0.25, 0.35].

15. The update method according to claim 12, wherein outputting the detection result through the logo detection model, comprises:

outputting the detection result to a user terminal through the logo detection model;
outputting the detection failure prompt through the logo detection model, comprises:

outputting a first detection failure prompt to the user terminal through the logo detection model;

and outputting a second detection failure prompt to an operation and maintenance terminal through the logo detection model.

16. The update method according to claim 12, further comprising:

adding the logo corresponding to the at least one logo labeling picture into a logo library corresponding to the first training data set to obtain a logo library corresponding to the second training data set.

17. A logo labeling device, comprising:

a memory, used for non-temporarily storing computer-readable instructions; and a processor, used for running the computer-readable instructions, wherein in a case where the computer-readable instructions are run by the processor, a logo labeling method is executed;

wherein the logo labeling method comprises;

acquiring a standard logo picture, wherein the standard logo picture comprises a logo;

based on the standard logo picture, determining transparency channel information corresponding to the standard logo picture to obtain a first logo picture, wherein the first logo picture comprises the transparency channel information;

determining a circumscribed rectangle frame of the logo in the first logo picture based on the transparency channel information, and performing cutting processing on the first logo picture according to the circumscribed rectangle frame to obtain a second logo picture, wherein the second logo picture comprises the logo;

performing data augmentation processing based on the second logo picture to obtain at least one third logo picture; and acquiring a background picture, determining pasting position information of the at least one third logo picture in the background picture, and pasting the at least one third logo picture on the background picture according to the pasting position information to obtain at least one logo labeling picture.

18. An update system of a logo detection model, comprising: a logo detection module and a logo labeling module, wherein the logo detection module is configured to:
acquire an input picture;
detect the input picture through the logo detection model to obtain a detection result, wherein the detection result comprises a confidence level;
judge whether the confidence level is greater than a second threshold, in a case where the confidence level is greater than the second threshold, output the detection result through the logo detection model, and in a case where the confidence level is not greater than the second threshold, output a detection failure prompt through the logo detection model; and in a case where the logo detection model outputs the detection failure prompt, judging whether the input picture comprises a logo or not, if the input picture comprises the logo, determine a standard logo picture according to the input picture, if the input picture does not comprise the logo, store the input picture; and the logo labeling module is configured to:
process the standard logo picture, which is obtained based on the input picture, by adopting the logo labeling method according to claim 1 to obtain at least one logo labeling picture;

add the at least one logo labeling picture into a first training data set to obtain a second training data set; and trigger an operation of updating the logo detection model based on the second training data set.

19. The update system according to claim 18, further comprising an update module,
wherein the update module is configured to update the logo detection model based on the second training data set to obtain an updated logo detection model.

20. A non-transitory storage medium, storing computer-readable instructions non-transiently, wherein in a case where the computer-readable instructions are executed by a computer, the logo labeling method according to claim 1 is executed.

* * * * *